US011944939B2

(12) United States Patent
Nakao et al.

(10) Patent No.: US 11,944,939 B2
(45) Date of Patent: Apr. 2, 2024

(54) HOLLOW FIBER MEMBRANE ELEMENT, HOLLOW FIBER MEMBRANE MODULE, AND METHOD OF FORWARD OSMOSIS WATER TREATMENT

(71) Applicant: TOYOBO CO., LTD., Osaka (JP)

(72) Inventors: Takahito Nakao, Osaka (JP); Hidehiko Sakurai, Osaka (JP)

(73) Assignee: TOYOBO MC CORPORATION, Osaka (JP)

( * ) Notice: Subject to any disclaimer, the term of this patent is extended or adjusted under 35 U.S.C. 154(b) by 545 days.

(21) Appl. No.: 17/283,752

(22) PCT Filed: Oct. 17, 2019

(86) PCT No.: PCT/JP2019/040912
§ 371 (c)(1),
(2) Date: Apr. 8, 2021

(87) PCT Pub. No.: WO2020/080469
PCT Pub. Date: Apr. 23, 2020

(65) Prior Publication Data
US 2021/0379534 A1    Dec. 9, 2021

(30) Foreign Application Priority Data

Oct. 19, 2018  (JP) ................................. 2018-197565

(51) Int. Cl.
*B01D 63/04*  (2006.01)
*B01D 61/00*  (2006.01)
(Continued)

(52) U.S. Cl.
CPC ......... *B01D 63/04* (2013.01); *B01D 61/0022* (2022.08); *B01D 63/033* (2022.08);
(Continued)

(58) Field of Classification Search
CPC .... C02F 1/445; C02F 1/04; C02F 1/42; C02F 1/441; C02F 1/48; C02F 2103/007;
(Continued)

(56) References Cited

U.S. PATENT DOCUMENTS

| 4,666,469 A | 5/1987 | Krueger et al. |
| 8,496,825 B1 | 7/2013 | Jons et al. |
| 2005/0218064 A1 | 10/2005 | Sengupta et al. |

FOREIGN PATENT DOCUMENTS

| CN | 86103357 A | 11/1986 |
| CN | 1689690 A | 11/2005 |

(Continued)

OTHER PUBLICATIONS

Office Action dated May 25, 2022, issued in counterpart CN Application No. 201980068524.5, with English Translation and Search report. (13 pages).
(Continued)

*Primary Examiner* — Dirk R Bass

(57) ABSTRACT

A hollow fiber membrane element, comprising: a core tube comprising a side face having a plurality of pores; and a hollow fiber membrane group consisting of a plurality of hollow fiber membranes disposed around the core tube, the hollow fiber membrane element being a both open-ended type hollow fiber membrane element in which both ends of the core tube and the plurality of hollow fiber membranes are open. The hollow fiber membrane group includes a first hollow fiber membrane layer composed of a plurality of first hollow fiber membranes disposed so as to surround the core tube and a second hollow fiber membrane layer composed of a plurality of second hollow fiber membranes disposed so as to surround the first hollow fiber membrane layer, and a permeability coefficient of the plurality of first hollow fiber (Continued)

membranes is smaller than a permeability coefficient of the plurality of second hollow fiber membranes.

7 Claims, 14 Drawing Sheets

(51) Int. Cl.
*B01D 63/02* (2006.01)
*B01D 63/06* (2006.01)
*C02F 1/44* (2023.01)

(52) U.S. Cl.
CPC ............ *B01D 63/065* (2013.01); *C02F 1/445* (2013.01); *B01D 2319/04* (2013.01); *B01D 2319/06* (2013.01); *C02F 2303/22* (2013.01)

(58) Field of Classification Search
CPC ............ C02F 2103/08; C02F 2303/22; Y02A 20/131; B01D 2313/10; B01D 2319/04; B01D 2319/06; B01D 61/002; B01D 61/0021; B01D 61/0022; B01D 61/005; B01D 63/02; B01D 63/025; B01D 63/033; B01D 63/04; B01D 63/065; C08G 73/0206; C08G 73/024; C08L 79/02; D01F 1/08
See application file for complete search history.

(56) References Cited

FOREIGN PATENT DOCUMENTS

| | | | |
|---|---|---|---|
| JP | 4-150924 A | 5/1992 |
| JP | 2002-045657 A | 2/2002 |
| JP | 2004-209418 A | 7/2004 |
| JP | 2011-036743 A | 2/2011 |
| JP | 2014-184402 A | 10/2014 |
| JP | 2017-074567 A | 4/2017 |
| KR | 10-2013-0064163 A | 6/2013 |
| KR | 10-2015-0127927 A | 11/2015 |
| WO | 2016/167267 A1 | 10/2016 |
| WO | 2017/010270 A1 | 1/2017 |

OTHER PUBLICATIONS

Notice of Allowance dated May 16, 2023, issued in counterpart KR Application No. 10-2021-7014270, with English Translation. (7 pages).

International Search Report dated Dec. 24, 2019, issued in counterpart International Application No. PCT/JP2019/040912, with English Translation. (4 pages).

Office Action dated Aug. 30, 2022, issued in counterpart CN application No. 201980068524.5 with English translation. (6 pages).

FIG.1
(a)
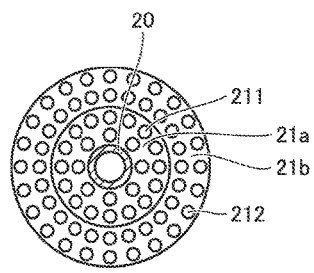
(b)
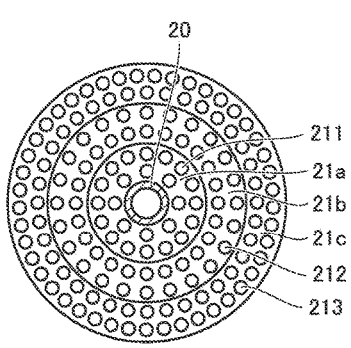

HOLLOW FIBER MEMBRANE ELEMENT, HOLLOW FIBER MEMBRANE MODULE, AND METHOD OF FORWARD OSMOSIS WATER TREATMENT

TECHNICAL FIELD

The present invention relates to a hollow fiber membrane element, a hollow fiber membrane module, and a method of forward osmosis water treatment.

BACKGROUND ART

Forward osmosis water treatment is a known technique which uses the forward osmosis phenomenon to recover fresh water from a treatment-target liquid (a feed solution) such as sea water, river water, or wastewater. Forward osmosis is a phenomenon in which water contained in a feed solution (FS), which has a lower concentration, permeates through a membrane to move toward a draw solution (DS), which has a higher concentration (a higher osmotic pressure).

Water treatment using this type of membrane has been in practical use in the form of a membrane module, which comprises a membrane element (a single component consisting of a plurality of membranes) accommodated in a pressure vessel. A hollow fiber membrane element, in particular, achieves an increased membrane area per unit volume of the membrane module and accordingly an increased total quantity of water permeation, and thereby it has a very high volumetric efficiency and a very compact size.

As is disclosed by PTL 1 (International Patent Laying-Open No. WO 2017/010270) and PTL 2 (Japanese Patent Laying-Open No. 2004-209418), for example, a both open-ended type hollow fiber membrane module is known, which comprises a core tube comprising a side face having a plurality of pores, and a hollow fiber membrane group consisting of a plurality of hollow fiber membranes disposed in a crisscross fashion around the core tube. A hollow fiber membrane module of this type that is for use in forward osmosis water treatment has a structure called a cross-flow-mode structure in which, as shown in FIG. 3, a flow of a liquid flowing through many pores 20a provided in a core tube 20 toward the outside 3 of hollow fiber membranes 21 is substantially perpendicular to a flow inside hollow fiber membranes 21.

When DS contains not much scale components and the like, flowing DS, compared to flowing FS (which usually contains scale components and the like), inside hollow fiber membranes 21 achieves a less scale adherence to hollow fiber membranes 21, and therefore it is desirable to flow DS inside hollow fiber membranes 21 and flow FS outside 3 of hollow fiber membranes 21.

In contrast, when DS has a high viscosity, for example, flowing DS inside hollow fiber membranes 21 results in an increased energy requirement for feeding DS and also in an increased likelihood of clogging hollow fiber membranes 21, and therefore it is desirable to flow DS outside 3 of hollow fiber membranes 21. Also, when pressure is applied to DS as in PRO (forward osmosis-pressure retarded osmosis), it is desirable to flow DS outside 3 of hollow fiber membranes 21 because the hollow fiber membranes have a higher resistance against external pressure and a lower resistance against internal pressure.

As in the latter case, when DS flows (through core tube 20 to) the outside 3 of hollow fiber membranes 21 and FS flows inside hollow fiber membranes 21, water contained in FS permeates from inside to outside of hollow fiber membranes 21 (see FIG. 8(b)).

In this case, referring to FIG. 2, DS (flowing outside 3 of hollow fiber membranes 21) becomes more and more diluted with the water that has permeated through the membranes as the DS flows farther away from core tube 20 (in a direction from A to B in FIG. 2(b)), and thereby the DS concentration near core tube 20 (I and III in FIG. 2) is higher than in other locations (II and IV in FIG. 2). Because of this, FS flowing inside hollow fiber membranes 21 near core tube 20 becomes particularly thickened, and FS is most thickened in the downstream (III in FIG. 2) (see FIG. 5). As a result, scales (deposits of calcium carbonate, magnesium carbonate, and the like from FS) are most likely to adhere to the hollow fiber membranes in the most-downstream part near core tube 20 (III in FIG. 2).

Therefore, it is necessary to adjust the FS flow rate to avoid scale formation in the most-downstream part near core tube 20 (III in FIG. 2). More specifically, considering that the degree of FS thickening increases and so does the likelihood of scale formation as the FS flow rate decreases, it is necessary to set the FS flow rate not lower than a predetermined flow rate at which no scale formation would occur in the most-downstream part near core tube 20.

However, as the FS flow rate increases, the rate of water recovery from FS decreases. And as the recovery rate decreases, more FS is required to obtain the same amount of water, leading to an increased cost for FS pretreatment and an increased energy requirement for feeding FS.

According to the disclosure of PTL 1, the inner diameter of the hollow fiber membrane constituting an inner layer of the hollow fiber membrane element is larger than the inner diameter of the hollow fiber membrane constituting an outer layer of the hollow fiber membrane element. According to the disclosure of PTL 2, the rate of permeation through the hollow fiber membrane constituting an inner layer of the hollow fiber membrane element is made faster than the rate of permeation through the hollow fiber membrane constituting an outer layer of the hollow fiber membrane element.

CITATION LIST

Patent Literature

PTL 1: International Patent Laying-Open No. WO 2017/010270

PTL 2: Japanese Patent Laying-Open No. 2004-209418

SUMMARY OF INVENTION

Technical Problem

The present disclosure has been devised to solve the above-described problems, and the present disclosure has an object to provide a hollow fiber membrane element, a hollow fiber membrane module, and a method of forward osmosis water treatment, each of which is capable of enhancing the rate of water recovery from a feed solution (FS) while reducing scale adhesion to hollow fiber membranes when a draw solution (DS) flows outside the hollow fiber membranes and FS flows inside the hollow fiber membranes.

Solution to Problem

[1] A hollow fiber membrane element, comprising:
a core tube comprising a side face having a plurality of pores;
a hollow fiber membrane group consisting of a plurality of hollow fiber membranes disposed around the core tube; and
resin walls securing the core tube and the hollow fiber membrane group at both ends,
the hollow fiber membrane element being a both open-ended type hollow fiber membrane element in which both ends of the core tube and the plurality of hollow fiber membranes are open,
the hollow fiber membrane group including a first hollow fiber membrane layer composed of a plurality of first hollow fiber membranes disposed so as to surround the core tube and a second hollow fiber membrane layer composed of a plurality of second hollow fiber membranes disposed so as to surround the first hollow fiber membrane layer,
a permeability coefficient of the plurality of first hollow fiber membranes being smaller than a permeability coefficient of the plurality of second hollow fiber membranes.

[2] The hollow fiber membrane element according to [1], wherein a rate of decrease of the permeability coefficient of the plurality of first hollow fiber membranes from the permeability coefficient of the plurality of second hollow fiber membranes is more than 0% and not more than 60%.

[3] The hollow fiber membrane element according to [1] or [2], wherein the hollow fiber membrane element has a shape of cylinder, and the ratio of a thickness of the first hollow fiber membrane layer to a total thickness of the first hollow fiber membrane layer and the second hollow fiber membrane layer is more than 0% and not more than 30%.

[4] The hollow fiber membrane element according to any one of [1] to [3], wherein the plurality of hollow fiber membranes are spirally wound around the core tube in a crisscross fashion.

[5] A hollow fiber membrane module comprising:
the hollow fiber membrane element according to any one of [1] to [4]; and
a vessel accommodating at least one hollow fiber membrane element according to any one of [1] to [4].

[6] A method of forward osmosis water treatment using the hollow fiber membrane module according to [5], the method comprising:
a forward osmosis step involving flowing a treatment-target water containing water and a component other than water inside the plurality of hollow fiber membranes and flowing a draw solution containing a draw solute through the core tube to outside of the plurality of hollow fiber membranes, so as to allow water contained in the treatment-target water to move across the plurality of hollow fiber membranes toward the draw solution.

[7] The method of forward osmosis water treatment according to [6], wherein a concentration of the draw solution is 7 mass % or more.

Advantageous Effects of Invention

According to the present invention, when a draw solution (DS) flows outside of hollow fiber membranes and a feed solution (FS) flows inside the hollow fiber membranes, the minimum flow rate of FS required for decreasing the likelihood of scale adhesion to the hollow fiber membranes is reduced. Thus, the present invention provides a hollow fiber membrane element, a hollow fiber membrane module, and a method of forward osmosis water treatment, each of which is capable of enhancing the rate of water recovery from FS while reducing scale adhesion to hollow fiber membranes.

When the minimum FS flow rate is reduced, capital expenditure (Capex), operating expenditure (Opex), and the like for FS pretreatment can be reduced.

BRIEF DESCRIPTION OF DRAWINGS

FIG. 1 is a cross-sectional schematic view of an embodiment of a hollow fiber membrane element according to the present invention.

DESCRIPTION OF EMBODIMENTS

Figure 2:
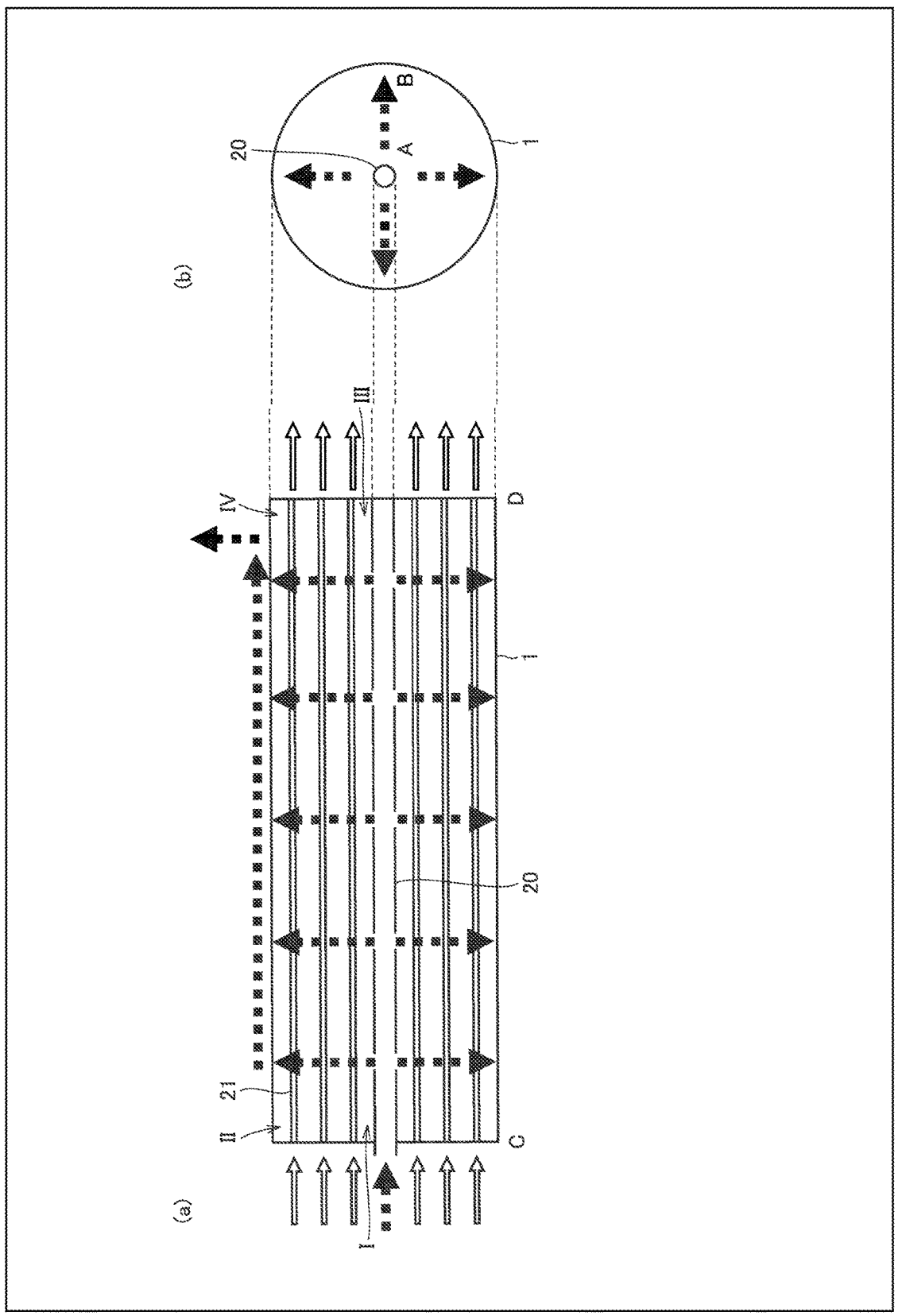
FIG. 2 is a cross-sectional schematic view describing a problem of a conventional hollow fiber membrane element.

Embodiments of the present invention will be described below, referring to drawings. In the drawings, the same or equivalent members are given with the same reference symbol. Dimensions including length, width, thickness, and depth may have been changed from the actual dimensions as appropriate for the clarification and simplification of the drawings, and therefore, dimensions may not agree with the actual dimensions.

(Hollow Fiber Membrane Element, Hollow Fiber Membrane Module)

Next, an embodiment of a hollow fiber membrane element and a hollow fiber membrane module according to the present invention is described.

Figure 3:
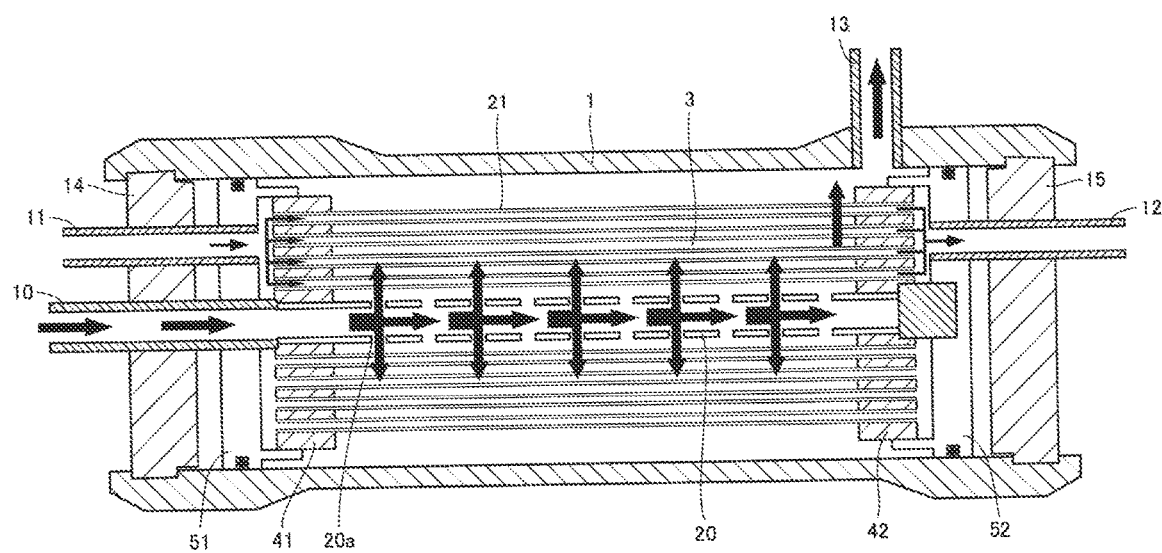
FIG. 3 is a cross-sectional schematic view of an embodiment of a hollow fiber membrane element and a hollow fiber membrane module according to the present invention.

Referring to FIG. 3, the hollow fiber membrane element according to the present embodiment comprises a core tube 20 comprising a side face having a plurality of pores 20a, a hollow fiber membrane group consisting of a plurality of hollow fiber membranes 21 disposed around core tube 20, and resin walls 41, 42 securing core tube 20 and the hollow fiber membrane group at both ends. This hollow fiber membrane element is a both open-ended type hollow fiber membrane element in which both ends of core tube 20 and the plurality of hollow fiber membranes 21 are open.

Referring to FIG. 1(a), the hollow fiber membrane group is composed of a first hollow fiber membrane layer 21a composed of a plurality of first hollow fiber membranes 211 disposed so as to surround core tube 20 and a second hollow fiber membrane layer 21b composed of a plurality of second hollow fiber membranes 212 disposed so as to surround first hollow fiber membrane layer 21a.

The hollow fiber membrane element according to the present embodiment is characterized in that the permeability coefficient of the plurality of first hollow fiber membranes 211 constituting first hollow fiber membrane layer 21a is smaller than the permeability coefficient of the plurality of second hollow fiber membranes 212 constituting second hollow fiber membrane layer 21b.

In the hollow fiber membrane element according to the present embodiment, the hollow fiber membrane group includes a double-layer structure (first hollow fiber membrane layer 21a and second hollow fiber membrane layer 21b) as shown in FIG. 1(a), but this is not limitative; instead, the hollow fiber membrane group may have a three-layer structure as shown in FIG. 1(b) that includes a third hollow fiber membrane layer 21c composed of a plurality of third hollow fiber membranes 213 having a permeability coefficient that is even higher than the permeability coefficient of second hollow fiber membranes 212, or may have a structure with four or more layers.

Referring to FIG. 3, the hollow fiber membrane module according to the present embodiment comprises at least one hollow fiber membrane element described above and a vessel 1 (for example, a pressure vessel that is pressure resistant enough to withstand the operational pressure) accommodating at least one hollow fiber membrane element described above.

This hollow fiber membrane module has a feeding inlet 10 connected to core tube 20, and a feeding inlet 11 and a discharging outlet 12 communicating with the interior of hollow fiber membranes 21, and is secured by wall members 14, 15, 51, 52. A side face of vessel 1 has a discharging outlet 13 that communicates with the outside of hollow fiber membranes 21. The fluid that has flown out through pores 20a of core tube 20 flows the outside 3 of the hollow fiber membranes in a radial direction of the hollow fiber membrane element.

Figure 4:
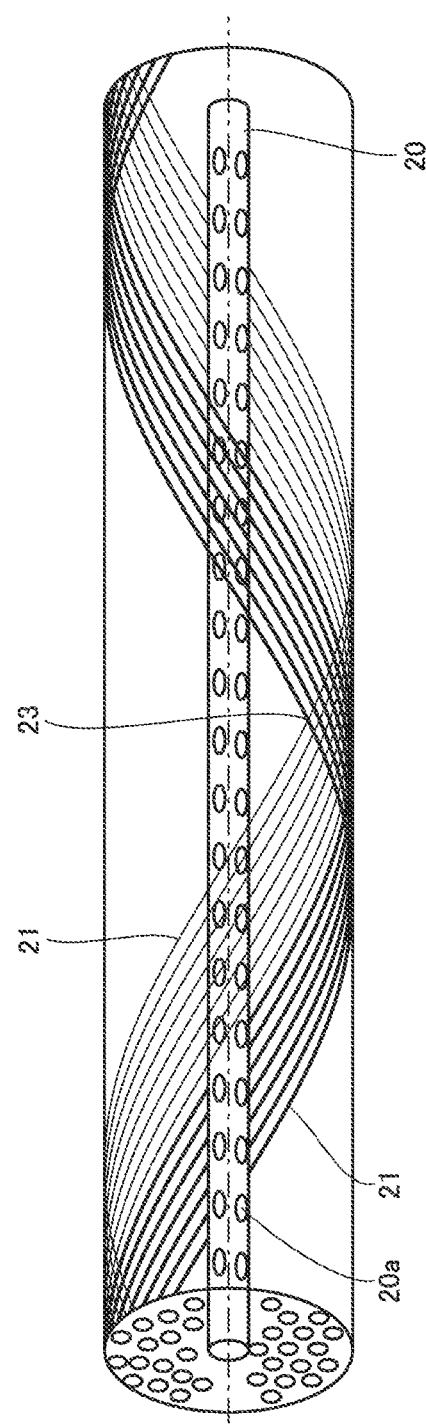
FIG. 4 is a schematic view of an embodiment of a hollow fiber membrane element according to the present invention.

Hollow fiber membranes 21 are illustrated parallel to core tube 2 in FIG. 2 and FIG. 3 for simplification, but in reality, the following arrangements may be adopted: the plurality of hollow fiber membranes are disposed parallel; and, as shown in FIG. 4, the plurality of hollow fiber membranes 21 constituting the hollow fiber membrane group (first hollow fiber membrane layer 21a and second hollow fiber membrane layer 21b) are spirally wound around core tube 20 in a crisscross fashion. To be spirally wound refers to an arrangement where the hollow fiber membranes are wound so that a certain angle is formed between them and the axis of the core tube.

When the plurality of hollow fiber membranes 21 are disposed in a crisscross fashion, spaces are formed in a regular pattern due to crossings 23 of the hollow fiber membranes. The presence of these regular spaces reduces drifting of the fluid outside of hollow fiber membranes 21. It also reduces the likelihood of undissolved components, particle components, and the like in the fluid flowing outside the hollow fiber membranes to be caught between the hollow fiber membranes, and thereby reduces the likelihood of an increase in pressure loss.

The hollow fiber membrane element according to the present embodiment may be formed by, for example, spirally winding hollow fiber membranes around a core tube in such an arrangement as they are crossing each other and overlaid radially on top of another, to form a hollow fiber membrane wound body, sealing both ends of the resulting hollow fiber membrane wound body with resin, and partially cutting the resin (the resin wall) to open the both ends of the hollow fiber membranes.

Next, specific examples of constituent members and the like of the hollow fiber membrane element and the hollow fiber membrane module according to the present embodiment will be described.

The core tube is a tubular member that has, when in connection to a feeding inlet, a function of distributing a fluid fed from the feeding inlet to the outside 3 (the outer surface) of the hollow fiber membranes within the hollow fiber membrane element. Preferably, the core tube is positioned substantially at the center of the hollow fiber membrane element.

When the diameter of the core tube is too large, the space occupied by the hollow fiber membranes within the membrane module decreases, and as a result, the membrane area of the membrane element or the membrane module decreases, potentially causing a decrease in the amount of water permeation per unit volume. When the diameter of the core tube is too small, pressure loss while the fed fluid is flowing inside the core tube increases, and as a result, the effective differential pressure applied to the hollow fiber membranes decreases and the treatment efficiency may be impaired. This may also reduce the strength, and as a result, the core tube may be damaged due to the tension of the hollow fiber membranes generated when the fed fluid flows through the hollow fiber membrane layer. It is important to consider these matter collectively when selecting the optimum diameter. Preferably, the ratio of the cross-sectional area of the core tube (including the hollow portions) to the cross-sectional area of the hollow fiber membrane element is 4 to 20%.

The material of the hollow fiber membrane may be any material as long as a desired separation performance (preferably, a high separation performance equivalent to that of a reverse osmosis membrane) is achieved, and, for example, cellulose-acetate-based resins, polyamide-based resins, sulfonated-polysulfone-based resins, and polyvinyl-alcohol-based resins may be used. Among these, cellulose-acetate-based resins and sulfonated-polysulfone-based resins such as sulfonated polysulfone and sulfonated polyether sulfone are preferable for their resistance against disinfectant chlorine and their ability to readily reduce microbial growth. In particular, these are characteristically capable of effectively reducing microbial contamination on the membrane surface. A preferable cellulose acetate is cellulose triacetate for its durability.

For the hollow fiber membrane element according to the present embodiment, the permeability coefficient of the plurality of first hollow fiber membranes constituting first hollow fiber membrane layer 21a is lower than the permeability coefficient of the plurality of second hollow fiber membranes constituting second hollow fiber membrane layer 21b.

The rate of decrease of the permeability coefficient of the plurality of first hollow fiber membranes from the permeability coefficient of the plurality of second hollow fiber membranes is preferably more than 0% and not more than 60%, more preferably not less than 5% and not more than 55%, further preferably not less than 10% and not more than 50%. Within this range, the effect of lowering the minimum FS flow rate and enhancing the FS recovery rate is expected to be more reliably exhibited. Moreover, when the present invention is applied to PRO, the effect of enhancing the amount of net output power is expected to be exhibited. The rate of decrease is a ratio represented by the below equation.

Rate of decrease=[((permeability coefficient of plurality of second hollow fiber membranes)−(permeability coefficient of plurality of first hollow fiber membranes))/(permeability coefficient of plurality of second hollow fiber membranes)]× 100[%]

The permeability coefficient (A) of the plurality of first hollow fiber membranes is preferably $1.0 \times 10^{-6}$ to $1.5 \times 10^{-5}$ cm$^3$/[cm$^2$·s·(kgf/cm$^2$)], more preferably $1.5 \times 10^{-6}$ to $1.3 \times 10^{-5}$ cm$^3$/[cm$^2$·s·(kgf/cm$^2$)].

The permeability coefficient of the hollow fiber membranes may be measured by assessment by a reverse osmosis method, for example.

More specifically, the permeability coefficient (a pure water permeability coefficient) A may be determined by the below method.

$$Jv = A(\Delta P - \pi(Cm)) \quad (1)$$

$$Js = B(Cm - Cp) \quad (2)$$

$$(Cm - Cp)/(Cf - Cp) = \exp(Jv/k) \quad (3)$$

$$Cp = Js/Jv \quad (4)$$

$$A = \alpha \times A25 \times \mu25/\mu \quad (5)$$

$$B = \beta \times B25 \times \mu25/\mu \times (273.15 + T)/(298.15) \quad (6)$$

Cf: Feed water concentration [mg/L]
Cm: Membrane surface concentration [mg/L]
Cp: Permeated water concentration [mg/L]
Js: Solute flux [mg/(cm$^2$·s)]
Jv: Pure water flux [cm$^3$/(cm$^2$·s)]
k: Mass transfer coefficient [cm/s]
A: Pure water permeability coefficient [cm$^3$/[cm$^2$·s·(kgf/cm$^2$)]]
A25: Pure water permeability coefficient at 25° C. [cm$^3$/[cm$^2$·s·(kgf/cm$^2$)]]
B: Solute permeability coefficient [cm/s]
B25: Solute permeability coefficient at 25° C. [cm$^3$/[cm$^2$·s·(kgf/cm$^2$)]]
T: Temperature [° C.]
α: Coefficient of variation attributed to operational conditions [-]
β: Coefficient of variation attributed to operational conditions [-]
ΔP: Operational pressure [kgf/cm$^2$]
μ: Viscosity [Pa·s]
μ25: Viscosity at 25° C. [Pa·s]
π: Osmotic pressure [kgf/cm$^2$]

More specifically, Jv, Cf, Cp, and T may be actually measured, and k and other physical property values may be substituted into the above equations (1) to (4), and thereby a pure water permeability coefficient A and a solute permeability coefficient B for the actual measurement conditions may be determined. Moreover, based on α and β obtained in advance, a pure water permeability coefficient at 25° C., A25, and a solute permeability coefficient at 25° C., B25, may be determined by the above equations (5) and (6), and furthermore, a pure water permeability coefficient and a solute permeability coefficient at any temperature T may also be obtained by the above equations (5) and (6).

As a factor that may affect the permeability coefficient of the hollow fiber membranes, the pore size of the fine pores of the hollow fiber membranes can be considered. The average pore size of the fine pores of the hollow fiber membranes is preferably from 0.1 nm to 0.1 μm, more preferably from 0.5 nm to 50 nm, further preferably from 0.5 nm to 5 nm, further more preferably from 0.5 nm to 2 nm. This average pore size may be measured by nitrogen gas adsorption, mercury porosimetry, permporometry, DSC, positron annihilation, and/or the like.

When the hollow fiber membrane element has a shape of cylinder, the ratio of the thickness of the first hollow fiber membrane layer to the total thickness of the hollow fiber membrane layers ((the thickness of the first hollow fiber membrane layer)+(the thickness of the second hollow fiber membrane layer)) is preferably more than 0% and not more than 30%, more preferably not less than 5% and not more than 25%. When the ratio falls within this range, the effect of enhancing the FS recovery rate is expected to be more reliably exhibited.

The inner diameter of the hollow fiber membranes is not particularly limited as long as it falls within the range for forward osmosis membrane, and is preferably not less than 50 μm and not more than 700 μm, more preferably not less than 80 μm and not more than 400 μm. When the inner diameter is smaller than the above range, the flow pressure loss of the fluid flowing inside the hollow fiber membranes is great, which presents a problem. When the inner diameter is larger than the above range, the membrane area per unit volume in the module cannot be increased, impairing the advantageous compact size of the hollow fiber membrane module.

The hollow rate of the hollow fiber membranes is not particularly limited as long as it is a hollow rate for forward osmosis membrane, and it is from 15 to 45%, for example. When the hollow rate is less than the above range, the flow pressure loss inside the hollow fiber membranes is great and thereby a desired amount of water flux may not be achieved. When the hollow rate is more than the above range, a sufficient pressure resistance may not be ensured even in forward osmosis water treatment applications. The hollow rate (%) may be determined by: hollow rate (%)=((inner diameter)/(outer diameter))$^2$×100.

The outer diameter of the hollow fiber membrane element (the hollow fiber membrane group) is preferably from 50 to 450 mm. When the outer diameter is too large, maintenance work including replacing membranes may be less easy. When the outer diameter is too small, the membrane area per unit membrane element is small and the throughput is also small, which are unpreferable from the economic standpoint.

The inner diameter, the outer diameter, and the hollow rate of the hollow fiber membranes may be measured in the below manner, for example. First, an appropriate number of hollow fiber membranes are drawn through a hole (diameter, 3 mm) that is made in the center of a slide glass, in a way that the hollow fiber membranes will not slip out of the hole, followed by cutting the hollow fiber membranes with a razor along the top face and the bottom face of the slide glass to obtain hollow fiber membrane cross section samples. Then, for a single hollow fiber membrane cross section, shorter diameters in two different directions and longer diameters in two different directions are measured with the use of a projector (Nikon PROFILE PROJECTOR V-12), and the arithmetic means are defined as the inner diameter and the outer diameter of the hollow fiber membrane cross section, respectively. This measurement is carried out for five cross sections, and the mean is defined as the inner diameter and the outer diameter of each hollow fiber membrane.

The hollow fiber membranes may be produced by the below methods. As described by Japanese Patent No. 3591618, for example, a membrane-forming solution containing cellulose triacetate, ethylene glycol (EG), and N-methyl-2-pyrrolidone (NMP) is discharged from a three-segment nozzle, passed through an aerial travelling portion, and then immersed in a water/EG/NMP coagulation liquid to obtain hollow fiber membranes, which are then rinsed with water and subjected to heat treatment, and thereby cellulose-acetate-based hollow fiber membranes may be produced. Or, a copolyamide obtained from terephthaloyl dichloride, 4,4'-diaminodiphenyl sulfone, and piperazine by low-temperature solution polymerization is purified and then dissolved in a dimethylacetamide solution containing $CaCl_2$ and diglycerin to prepare a membrane-forming solution, which is discharged from a three-segment nozzle via an aerial travelling portion into a coagulation liquid, followed by rinsing the resulting hollow fiber membranes with water and subjecting them to heat treatment, and thereby polyamide-based hollow fiber membranes may be produced. Or, 3,3'-disulfo-4,4'-dichlorodiphenylsulfone disodium salt, 2,6-dichlorobenzonitrile, and 4,4'-biphenol are polymerized to obtain a sulfonated polyaryl ether sulfone polymer, which is then dissolved in NMP and EG to prepare a membrane-forming solution, and this solution together with EG as a bore liquid are then discharged from a tube-in-orifice nozzle, immersed in a coagulation bath of salt water, followed by heat treatment of the resulting hollow fiber membranes, and thereby sulfonated-polysulfone-based hollow fiber membranes may be produced.

The hollow fiber membranes thus obtained are incorporated by a conventionally known method to form a hollow fiber membrane element. The incorporation of the hollow fiber membranes may be carried out as described by, for example, Japanese Patent No. 4412486, Japanese Patent No. 4277147, Japanese Patent No. 3591618, and Japanese Patent No. 3008886, as follows. The hollow fiber membranes (45 to 90 or more) are gathered to form a single hollow fiber membrane assembly. A plurality of the hollow fiber membrane assemblies are placed side by side to form a flat bundle of hollow fiber membranes, which is then traversely wound around a core tube having many pores. The length of the core tube, the rotational rate, and the traversing rate of the hollow fiber membrane bundle may be adjusted so that crossings are formed on certain circumferential positions of the wound body. Then, the length and the positions of the crossings are adjusted, and the wound body is cut at a predetermined position. Subsequently, an impermeable film is placed on the outer circumference of the hollow fiber wound body, without covering the pore parts of the core tube and opposite sides, and both ends of the wound body are fixed with adhesive, followed by cutting the both sides to form openings of the hollow fiber membranes, and thereby a hollow fiber membrane element is prepared.

The hollow fiber membrane element according to the present invention achieves an increased membrane area per element compared to a spiral flat membrane; an element of substantially the same size can have a membrane area about 10 times the membrane area of a spiral one (although this depends on the size of the hollow fiber membranes). Moreover, drifting of the flow inside the element is less likely to occur, which is preferable for a water treatment where concentration difference is used as a driving force.

(Method of Forward Osmosis Water Treatment)

The above-described hollow fiber membrane module can be suitably used in a method of forward osmosis water treatment, which comprises a forward osmosis step involving flowing a treatment-target water (FS) containing water and a component other than water inside the plurality of hollow fiber membranes and flowing a draw solution (DS) containing a draw solute through the core tube to outside of the plurality of hollow fiber membranes, so as to allow water contained in the treatment-target water to move across the plurality of hollow fiber membranes toward the draw solution.

The feed solution (FS) is not particularly limited as long as it is a liquid containing water and a component other than water, but an effect according to the present embodiment is exhibited particularly effectively when FS contains a scale component. Examples of the scale component include calcium carbonate and magnesium carbonate. Examples of the FS containing a scale component include sea water, brackish water, river water, lake and pond water, industrial wastewater, and domestic wastewater. When FS (treatment-target water) is a salt-rich solution such as sea water, the total dissolved solid concentration (TDS) of the treatment-target water is preferably from 0.7 to 14 mass %, more preferably from 1.5 to 10 mass %, further preferably from 3 to 8 mass %.

The draw solution (DS) is not particularly limited as long as it is a liquid containing a draw solute and having a higher osmotic pressure than the feed solution. The osmotic pressure of the draw solution is preferably from 0.5 to 20 MPa (although it depends on the molecular weight of the solute, and the like).

The concentration of the draw solution is preferably from 7 mass % or more. In this case, the effect according to the present invention to lower the minimum flow rate of FS required for inhibiting scale adhesion to the hollow fiber membranes (a minimum FS flow rate) is more effectively exhibited.

The draw solute may be any of various known ones for use in forward osmosis water treatment, and the draw solute in the draw solution is not necessarily in a dissolved state.

Examples of a preferable draw solute include stimuli-responsive polymers. Examples of the stimuli-responsive polymers include temperature-responsive polymers, pH-responsive polymers, photoresponsive polymers, and magnetic-responsive polymers.

The temperature-responsive polymer is a polymer having properties (temperature responsivity) that its hydrophilicity changes at a predetermined temperature (critical temperature). The temperature responsivity is, in other words, properties that the polymer becomes hydrophilic or hydrophobic depending on the temperature. The change in hydrophilicity is preferably reversible. In this case, the temperature can be adjusted to make the temperature-responsive polymer dissolved in water or undergo phase separation from water.

Preferably, the temperature-responsive polymer is a polymer consisting of a plurality of monomer-derived structural units and has a hydrophilic group in a side chain.

Temperature-responsive polymers are classified into the lower critical solution temperature (LCST) type and the upper critical solution temperature (UCST) type. The LCST-type polymer dissolved in low-temperature water undergoes phase separation from water at a certain temperature or higher specific to the polymer (LCST), while the UCST-type polymer dissolved in high-temperature water undergoes phase separation from water at a certain temperature or lower specific to the polymer (UCST) (see Sugihara et al., "Development to Self-Organization of Stimuli-Responsive Polymers", SEN'I GAKKAISHI, Vol. 62, No. 8, 2006). When a semipermeable membrane that is used is made of a material prone to degradation at high temperatures, the temperature-responsive polymer for use in the present invention is preferably of LCST type because it is desirable that the temperature-responsive polymer dissolved in low-temperature water be in contact with the semipermeable membrane. When the semipermeable membrane that is used is made of a material less prone to degradation at high temperatures, either LCST type or UCST type can be used.

Examples of the hydrophilic group include hydroxy group, carboxy group, acetyl group, aldehyde group, ether bond, and ester bond. Preferably, the hydrophilic group is at least one selected from these.

The temperature-responsive polymer preferably has at least one hydrophilic group in at least some or all of the structural units. Moreover, the temperature-responsive polymer may have a hydrophilic group, and may have a hydrophobic group in some of the structural units. It is considered that the balance between the hydrophilic groups and the hydrophobic groups in the molecule is important for the temperature responsivity of the temperature-responsive polymer.

Specific examples of the temperature-responsive polymer include polyvinyl-ether-based polymers, polyvinyl-acetate-based polymers, and (meth)acrylic-acid-based polymers.

When the hollow fiber membranes are used as forward osmosis membranes, as in the method of forward osmosis water treatment according to the present invention, the pressure of the fluid to flow inside the hollow fiber membranes (FS) is preferably 0.2 MPa or less because of the pressure resistance of the hollow fiber membranes and because of no necessity for a high-pressure pump. On the other hand, the pressure of DS to flow outside the hollow membranes is preferably 0.01 MPa or more.

The method of forward osmosis water treatment according to the present invention preferably further comprises, after the osmosis step, a separation step involving separating the draw solute contained in the draw solution from water.

As the separation technique, a technique that is compatible with the type of the draw solute is selected. For example, crystallization treatment can be selected for an inorganic salt, a low-melting substance, and/or the like; gas diffusion can be selected for a gas that is highly soluble in water; magnetic separation can be selected for magnetic substance fine particles; ion exchange can be selected for a sugar solution; and for a stimuli-responsive polymer, the corresponding stimulation (such as temperature, pH, electricity, magnetic field, and/or light) can be selected. Examples of common separation techniques include distillation and reverse osmosis membrane treatment.

When the draw solute is a temperature-responsive polymer, for example, the draw solute contained in the draw solution can be separated from water by flowing the draw solution in a different chamber from the one for the hollow fiber membrane module, and changing the temperature of the draw solution within the chamber. In this case, the draw solute (the temperature-responsive polymer) can be easily separated and recovered from water just by changing the temperature of the draw solution. Moreover, the recovered draw solute can be easily reused (redissolved in the draw solution and the like).

The method of forward osmosis water treatment according to the present invention preferably further comprises a recovery step involving recovering the draw solute that has been separated from water. The recovery of the draw solute may be carried out by using a membrane separation apparatus, a centrifuge apparatus, and a sedimentation apparatus, for example. The water left after the draw solute recovery step may be collected so as to obtain water, which is intended by the water treatment method. The draw solute recovery step may be repeated multiple times for obtaining pure water, and, after the draw solute recovery step, another treatment may also be carried out for further enhancing the water quality.

The method of forward osmosis water treatment according to the present invention may further comprise a reuse step involving redissolving the draw solute recovered in the recovery step into the draw solution.

Figure 5:
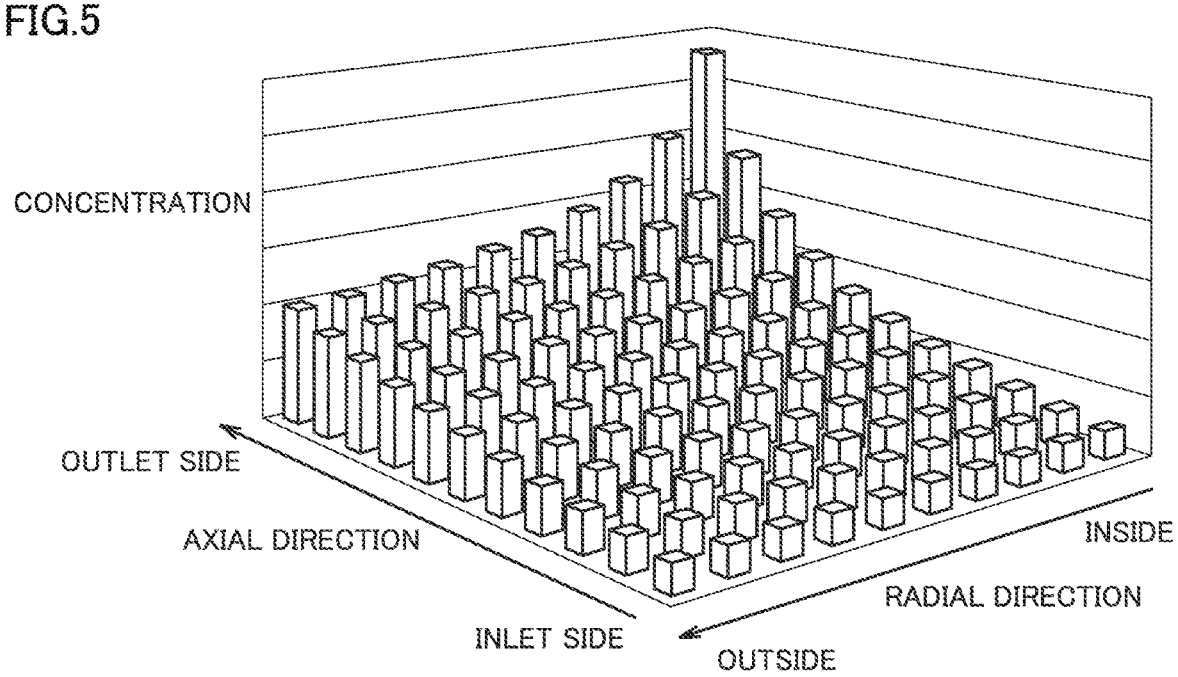
FIG. 5 is a schematic graph showing FS concentration distribution in a forward osmosis module (a hollow fiber membrane module) in FIG. 2 and FIG. 3.

When flowing the treatment-target water (FS) inside the plurality of hollow fiber membranes and flowing DS through the core tube to the outside the plurality of hollow fiber membranes, as in the method of forward osmosis water treatment according to the present embodiment, the FS concentration distribution inside the hollow fiber membrane module is a three-dimensional distribution as shown in FIG. 5.

More specifically, the farther inward in the radial direction of the hollow fiber membrane module, the higher the FS concentration. This is because as DS (discharged through the plurality of pores 20a of core tube 20) moves outward in the radial direction, DS is gradually diluted with the water from FS flowing inside hollow fiber membranes 21, and, due to this, the farther inward in the radial direction of the hollow fiber membrane module, the higher the DS concentration, and the higher the degree of FS thickening. Moreover, the closer to the hollow fiber membrane module outlet side in the axial direction, the higher the FS concentration. This is because as FS moves inside the hollow fiber membranes closer to the hollow fiber membrane module outlet side in the axial direction, the FS is more thickened.

Therefore, in the method of forward osmosis water treatment according to the present embodiment, the degree of FS thickening is highest (most thickened) and scale deposition is most likely at the hollow fiber membrane module outlet side in the axial direction and inside in the radial direction (III in FIG. 2). Therefore, by adjusting the FS flow rate so that scale deposition does not occur at this position (or, so that the degree of FS thickening at this position does not exceed a predetermined threshold), scale deposition can be inhibited in the entire FO module.

The hollow fiber membrane element, the hollow fiber membrane module, and the method of forward osmosis water treatment according to the present invention achieve a high rate of water recovery from FS, and therefore they are very useful in the field of water treatment as well as the field of energy production where concentration difference is used as a driving force.

More specifically, the present invention is applicable to concentration and recovery of organic matter, volume reduction of wastewater via concentration, desalination of sea water, and the like.

The present invention is also applicable to and suitable in pressure retarded osmosis (PRO), which involves using concentration difference (osmotic pressure difference) as a driving force to cause semipermeable membrane permeation from a low-concentration aqueous solution to a high-concentration pressurized aqueous solution to obtain fresh water, then using the increased flow rate and pressure of the high-concentration pressurized aqueous solution (increased due to the permeated fresh water) to operate a turbine and the like, and thereby producing energy such as electric power. In particular, the present invention is applicable to and suitable in, among others, PRO which involves using osmotic pressure attributed to concentration difference between sea water or concentrated sea water and fresh water to produce electric power.

When the present invention is applied to PRO, the minimum FS flow rate capable of inhibiting scale deposition inside the hollow fiber membrane is decreased and thereby the FS flow rate can be lowered, making it possible to enhance the amount of net output power after allowance for the amount of energy required for feeding FS.

EXAMPLES

The below Examples are given to provide a more specific illustration of the present invention, but these Examples are not intended to limit the scope of the invention.

Example 1

In this Example, the present invention was applied to FO (forward osmosis water treatment), and the minimum FS flow rate and the FS recovery rate were calculated in simulation under the below conditions.

In this Example, a hollow fiber membrane module (diameter, 10 inches: effective length, 1310 mm) having a single hollow fiber membrane element as shown in FIG. 3 accommodated in a pressure vessel was used, and water as a treatment-target water (FS) was flown inside the plurality of hollow fiber membranes and DS (concentration, 70000 ppm (about 7 mass %)) was flown through a core tube to the outside the plurality of hollow fiber membranes.

As the hollow fiber membrane element, one having a double-layer structure as shown in FIG. 1($a$) was used. In other words, in this Example, a first hollow fiber membrane layer consisting of a plurality of first hollow fiber membranes was disposed around the core tube, and around the resultant, a second hollow fiber membrane layer consisting of a plurality of second hollow fiber membranes was disposed. The radius of the hollow fiber membrane element was 5 inches, and the ratio of the thickness of the first hollow fiber membrane layer to the total thickness of the hollow fiber membrane layers ((the thickness of the first hollow fiber membrane layer)+(the thickness of the second hollow fiber membrane layer)) was 20%. The number of the hollow fiber membranes to be filled in each layer was selected so that both the filling rate of the first hollow fiber membrane and that of the second hollow fiber membrane (see the below equation) were 50%.

The plurality of hollow fiber membranes were spirally wound around the core tube in a manner that the hollow fiber membranes crossed each other, and thus a hollow fiber membrane wound body was formed. The filling rate of each hollow fiber membrane was calculated by the below equation.

Filling rate (%)=π×(outer diameter of hollow fiber membrane)$^2$/4 ($m^2$)×(total length of hollow fiber membrane ($m$))/(volume in hollow fiber membrane wound body) ($m^3$)×100%

As each of the volume of the first hollow fiber membrane layer and the volume of the second hollow fiber membrane layer in the hollow fiber wound body, a part of the entire volume of the hollow fiber membrane wound body was allocated according to the thickness ratio of each of the first hollow fiber membrane layer and the second hollow fiber membrane layer.

The inner diameter of the hollow fiber membranes (the first hollow fiber membrane and the second hollow fiber membrane) was 105 μm, and the outer diameter thereof was 200 μm. In this case, the hollow rate of the hollow fiber membranes was about 27.6%. The number of the hollow fiber membranes to be filled was selected so that the filling rate of the hollow fiber membranes was 50%. The permeability coefficient of the second hollow fiber membrane was 7.68×10$^{-6}$ [cm$^3$/[cm$^2$·s·(kgf/cm$^2$)]], and the rate of decrease of the permeability coefficient of the first hollow fiber membrane from the permeability coefficient of the second hollow fiber membrane was changed within the range of 0 to 80%.

Referring to FIG. 3, a preset amount of FS (water) was fed from feeding inlet 11 which communicated with the upstream opening of hollow fiber membranes 21, and FS was discharged from discharging outlet 12 which communicated with the downstream opening of hollow fiber membranes 21. The preset amount for FS was selected so that on an assumption that the hollow fiber membrane layer was divided in the thickness direction into ten parts and the recovery rate for each was calculated in simulation, the FS recovery rate of the layer closest to the core tube among the ten layers was 80%. For this reason, the FS feeding flow rate varied according to the rate of decrease of the permeability coefficient of the first hollow fiber membrane. Meanwhile, DS (NaCl concentration, 70000 ppm) was fed from feeding inlet 10 which communicated with core tube 20 at a flow rate of 30 L/minute (applied pressure, FS feeding pressure+0.1 MPa), passed through the plurality of pores 20$a$ of core tube 20 to outside 3 of hollow fiber membranes 21, and then discharged from discharging outlet 13 provided in a side face of vessel 1 and communicated with outside 3 of hollow fiber membranes 21.

The FS flow rate at which the maximum recovery rate of the hollow fiber membrane element (the hollow fiber membrane module) (the rate of FS-to-DS water recovery at position III in FIG. 2) was 80 mass % was calculated as the minimum FS flow rate. The FS recovery rate at the minimum FS flow rate (the total FS-to-DS water recovery rate for the entire hollow fiber membrane module) was also calculated.

Figure 6:
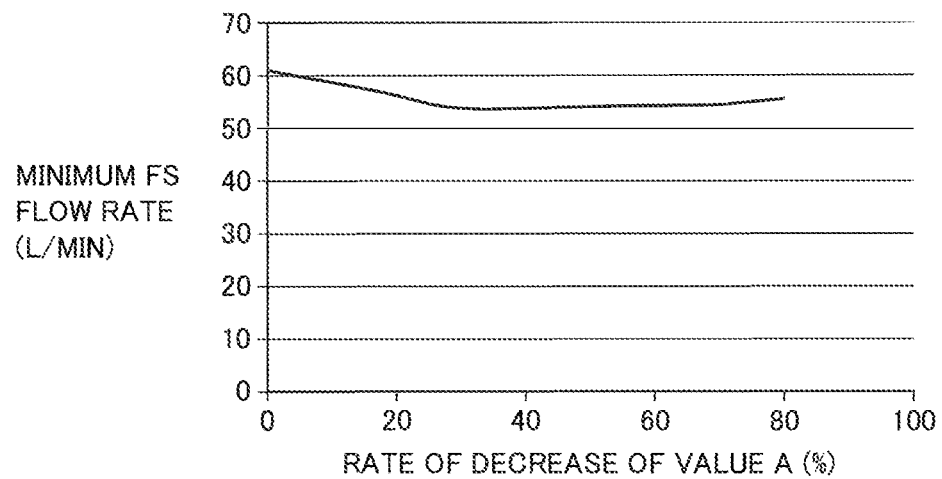
FIG. 6 is a graph showing a correlation between the rate of decrease of the value A and the minimum FS flow rate in Example 1 (FO).
Figure 7:
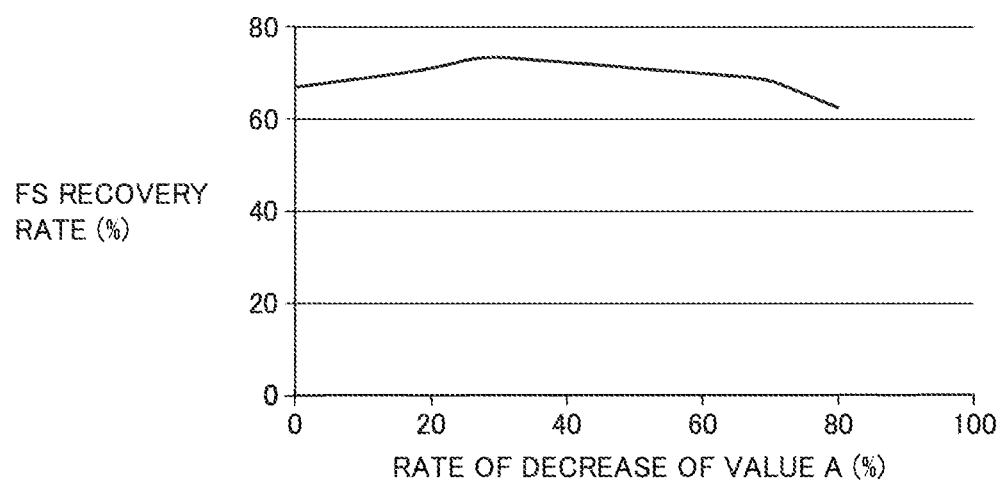
FIG. 7 is a graph showing a correlation between the rate of decrease of the value A and the rate of water recovery from FS (an FS recovery rate) at the minimum FS flow rate in Example 1 (FO).

Results of calculation of the minimum FS flow rate and the FS recovery rate are shown in FIG. 6 and FIG. 7, respectively.

The results shown in FIG. 6 and FIG. 7 indicate that the rate of decrease of the permeability coefficient of the plurality of first hollow fiber membranes from the permeability coefficient of the plurality of second hollow fiber membranes (the rate of decrease of the value A) is preferably more than 0% and not more than 60%, more preferably not less than 5% and not more than 55%, further preferably not less than 10% and not more than 50%. Within this range, compared to when the first hollow fiber membrane and the second hollow fiber membrane constituting the hollow fiber membrane element have the same permeability coefficient (when the rate of decrease of the value A in FIG. 6 and FIG. 7 is 0%), the minimum FS flow rate is expected to be lowered and the FS recovery rate is expected to be enhanced.

Example 2

In this Example, the present invention was applied to PRO (forward osmosis power generation) as shown in FIG. 8(a), and the minimum FS flow rate and the amount of net output power were calculated in simulation.

The hollow fiber membranes (the first hollow fiber membrane and the second hollow fiber membrane) of the hollow fiber membrane module had an inner diameter of 135 μm and an outer diameter of 300 μm. In this case, the hollow rate of the hollow fiber membranes was 20.25%. The permeability coefficient of the second hollow fiber membrane was $2.18 \times 10^{-6}$ [cm$^3$/[cm$^2$·s·(kgf/cm$^2$)]], and the rate of decrease of the permeability coefficient of the first hollow fiber membrane from the permeability coefficient of the second hollow fiber membrane was changed within the range of 0 to 70%. The effective length of the hollow fiber membrane module was 1995 mm. Except these, the hollow fiber membrane module used was the same as the one in Example 1, and the minimum FS flow rate and the amount of net output power were calculated in simulation for PRO conducted under the below conditions. In the same manner as in Example 1, a treatment-target water (FS) was flown inside the plurality of hollow fiber membranes and DS was flown through the core tube to the outside the plurality of hollow fiber membranes (see FIG. 8(b)).

Figure 8:
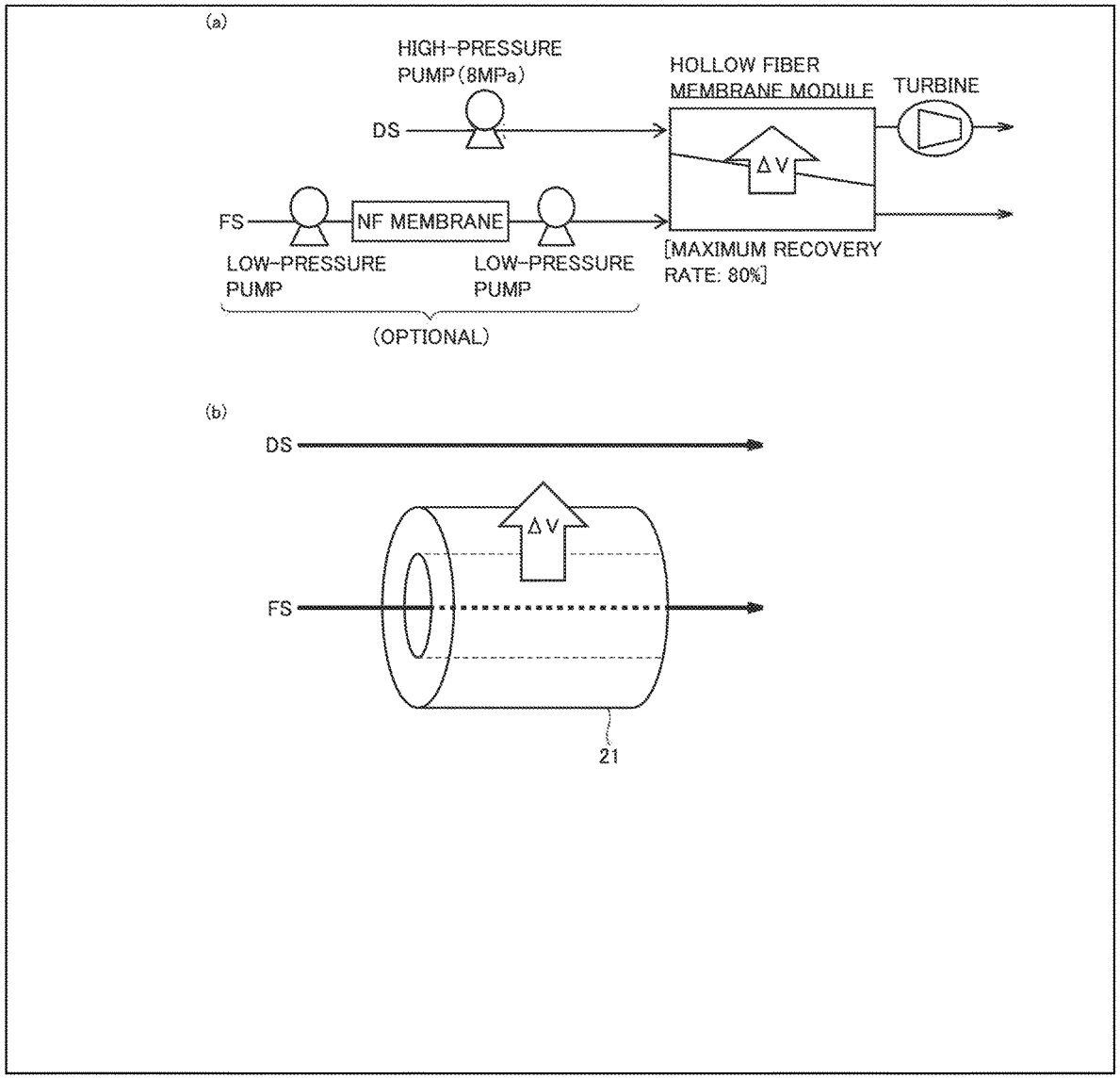
FIG. 8 is a schematic view describing PRO.

Referring to FIG. 3 and FIG. 8, a preset amount of water as FS was fed from feeding inlet 11 which communicated with the upstream opening of hollow fiber membranes 21, and FS was discharged from discharging outlet 12 which communicated with the downstream opening of hollow fiber membranes 21. The preset amount for FS was selected so that on an assumption that the hollow fiber membrane layer was divided in the thickness direction into ten parts and the recovery rate for each was calculated in simulation, the FS recovery rate of the layer closest to the core tube among the ten layers was 80%. For this reason, the FS feeding flow rate varied according to the rate of decrease of the permeability coefficient of the first hollow fiber membrane. Meanwhile, DS (concentration, 200000 ppm) was fed from feeding inlet 10 which communicated with core tube 20 at a flow rate of 30 L/minute (applied pressure, 8 MPa), passed through the plurality of pores 20a of core tube 20 to outside 3 of hollow fiber membranes 21, and then discharged from discharging outlet 13 provided in a side face of vessel 1 and communicated with outside 3 of hollow fiber membranes 21. Filtration (pretreatment) of FS through an NF membrane (optional) shown in FIG. 8 was not carried out in this Example.

Figure 9:
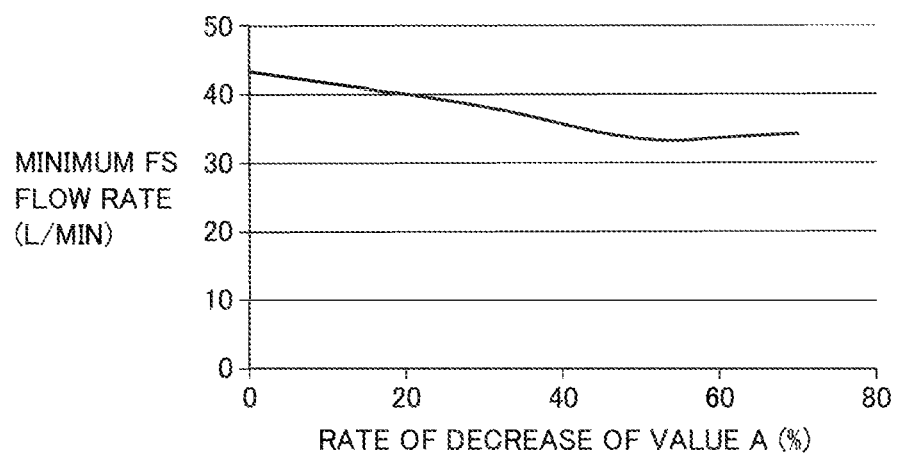
FIG. 9 is a graph showing a correlation between the rate of decrease of the value A and the minimum FS flow rate in Example 2 (PRO).
Figure 10:
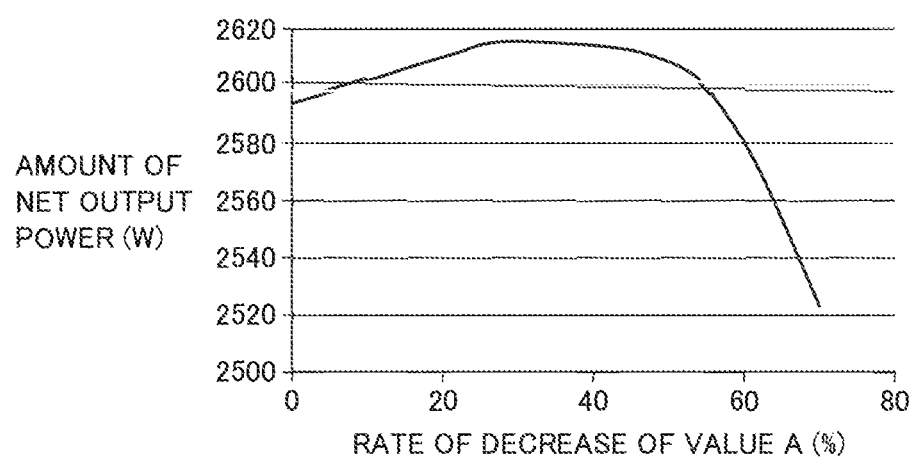
FIG. 10 is a graph showing a correlation between the rate of decrease of the permeability coefficient of first hollow fiber membranes from the permeability coefficient (A) of second hollow fiber membranes (the rate of decrease of the value A) and the amount of net output power in Example 2 (PRO).

Results of calculation of the minimum FS flow rate and the amount of net output power are shown in FIG. 9 and FIG. 10, respectively.

The results shown in FIG. 9 and FIG. 10 indicate that the rate of decrease of the permeability coefficient of the plurality of first hollow fiber membranes from the permeability coefficient of the plurality of second hollow fiber membranes (the rate of decrease of the value A) is preferably more than 0% and not more than 60%, more preferably not less than 5% and not more than 55%, further preferably not less than 10% and not more than 50%. Within this range, the effect of lowering the minimum FS flow rate and enhancing the FS recovery rate is expected to be more reliably exhibited. Moreover, when the present invention is applied to PRO, the effect of enhancing the amount of net output power is expected to be exhibited.

Example 3-1

In this Example, three types of DS with different concentrations (concentration, 150000 ppm, 200000 ppm, 250000 ppm) were used to carry out PRO (forward osmosis power generation), and the membrane-permeating flow rate, the minimum FS flow rate, and the amount of net output power were calculated in simulation.

In this Example, the permeability coefficient of the second hollow fiber membrane was $2.18 \times 10^{-6}$ [cm$^3$/[cm$^2$·s·(kgf/cm$^2$)]], and the rate of decrease of the permeability coefficient of the first hollow fiber membrane from the permeability coefficient of the second hollow fiber membrane was changed within the range of 0 to 80%. Except these, calculation was carried out in the same manner as in Example 2.

Figure 11:
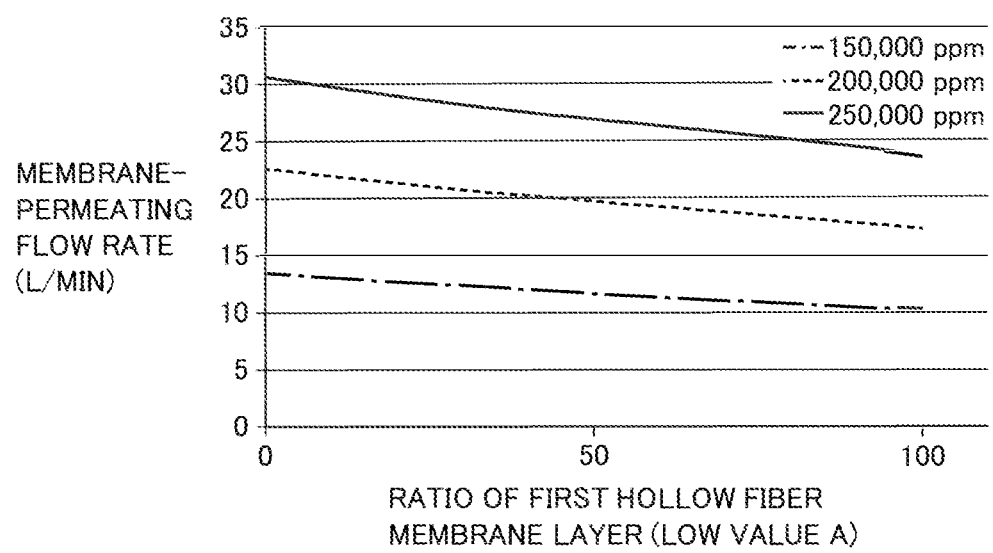
FIG. 11 is a graph showing a correlation between the ratio of a first hollow fiber membrane layer (the ratio of the thickness of the first hollow fiber membrane layer) and the maximum value of the membrane-permeating flow rate capable of inhibiting scale formation in Example 3-1 (PRO).
Figure 12:
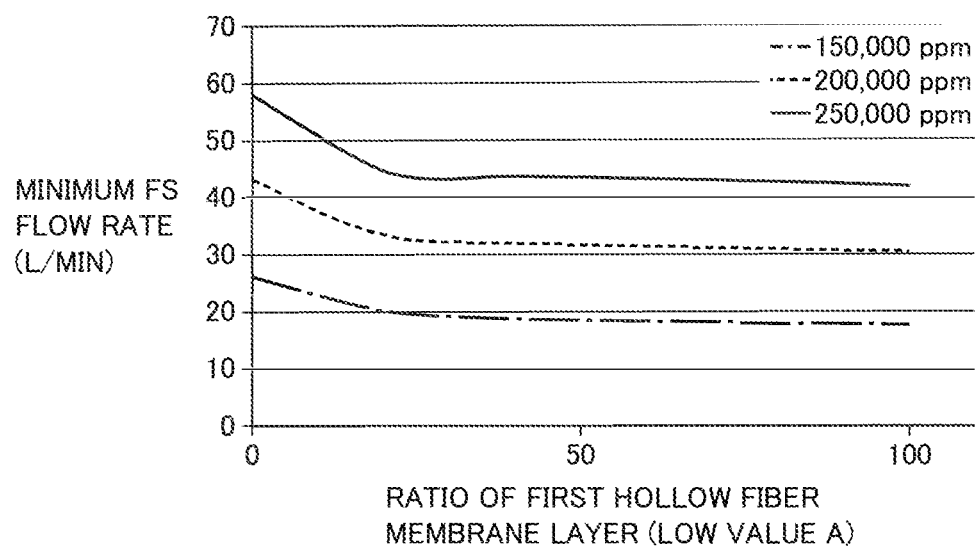
FIG. 12 is a graph showing a correlation between the ratio of a first hollow fiber membrane layer and the minimum FS flow rate in Example 3-1 (PRO).
Figure 13:
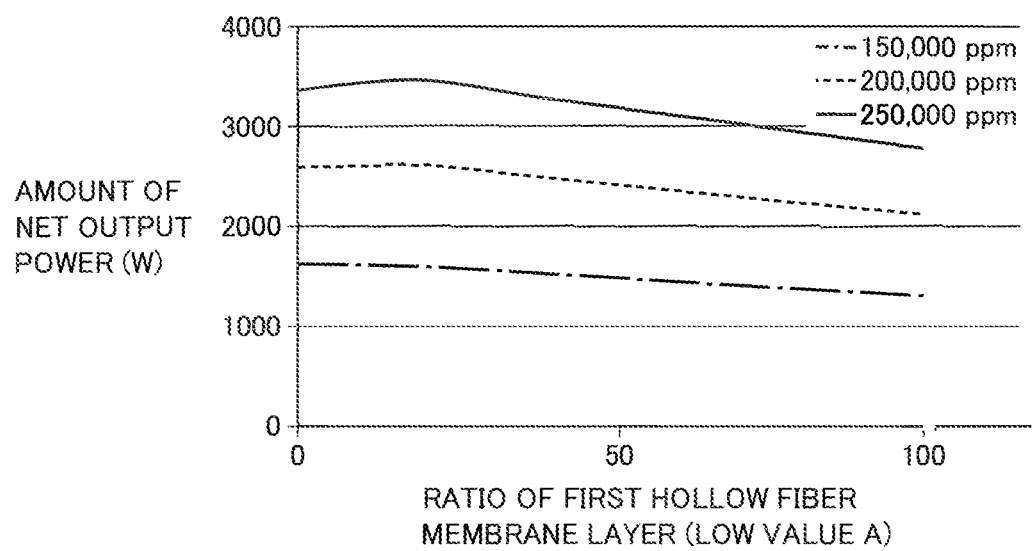
FIG. 13 is a graph showing a correlation between the ratio of a first hollow fiber membrane layer and the amount of net output power at the minimum FS flow rate in Example 3-1 (PRO).

Results of calculation of the membrane-permeating flow rate, the minimum FS flow rate, and the amount of net output power are shown in FIG. 11 to FIG. 13. FIG. 11 is a graph showing a correlation between the ratio of the thickness of the first hollow fiber membrane layer and the maximum value of the membrane-permeating flow rate capable of inhibiting scale formation. FIG. 12 is a graph showing a correlation between the ratio of the thickness of the first hollow fiber membrane layer and the minimum FS flow rate capable of inhibiting scale formation. FIG. 13 is a graph showing a correlation between the ratio of the thickness of the first hollow fiber membrane layer and the amount of net output power at the minimum FS flow rate capable of inhibiting scale formation.

The results shown in FIG. 12 indicate that, when the ratio of the first hollow fiber membrane layer (the ratio of the thickness of the first hollow fiber membrane layer to the radius of the hollow fiber membrane module) is 30% or less, the higher the ratio of the first hollow fiber membrane layer (an inner layer where the hollow fiber membranes have a low value A) is, the lower the minimum FS flow rate is expected to be. It is expected that further increasing the ratio of the first hollow fiber membrane layer would not markedly enhance the effect of decreasing the minimum FS flow rate. In this regard, as shown in FIG. 11, the higher the ratio of the first hollow fiber membrane layer, the lower the total permeating flow rate of the hollow fiber membrane module. From these viewpoints, for the purpose of enhancing the FS recovery rate, the ratio of the first hollow fiber membrane layer (the ratio of the thickness of the first hollow fiber membrane layer to the radius of the hollow fiber membrane element) is preferably more than 0% and not more than 30%, more preferably not less than 5% and not more than 25%.

The simulation results of the amount of net output power shown in FIG. 13 indicate that, in PRO to which the present invention is applied, when hollow fiber membranes having a low permeability coefficient are used in the first hollow fiber membrane layer (the inner layer), the amount of net output power is expected to be enhanced. The amount of net output power refers to the amount of output power calculated by subtracting the amount of energy required for power generation (such as the electric power required for feeding DS and FS) from the total amount of output power. Since the present invention makes it possible to lower the minimum FS flow rate, it is also expected to enhance the amount of net output power.

Example 3-2

In this Example, FS pretreatment was carried out with the use of an optional NF membrane shown in FIG. 8, and the amount of net output power was calculated taking into account the power required for this pretreatment (by subtracting it from the total amount of output power). Except these, under the same conditions as in Examples 3, the amount of net output power (the amount of net output power after allowance for the pretreatment) was calculated in simulation. Results of calculation are shown in FIG. 14.

Figure 14:
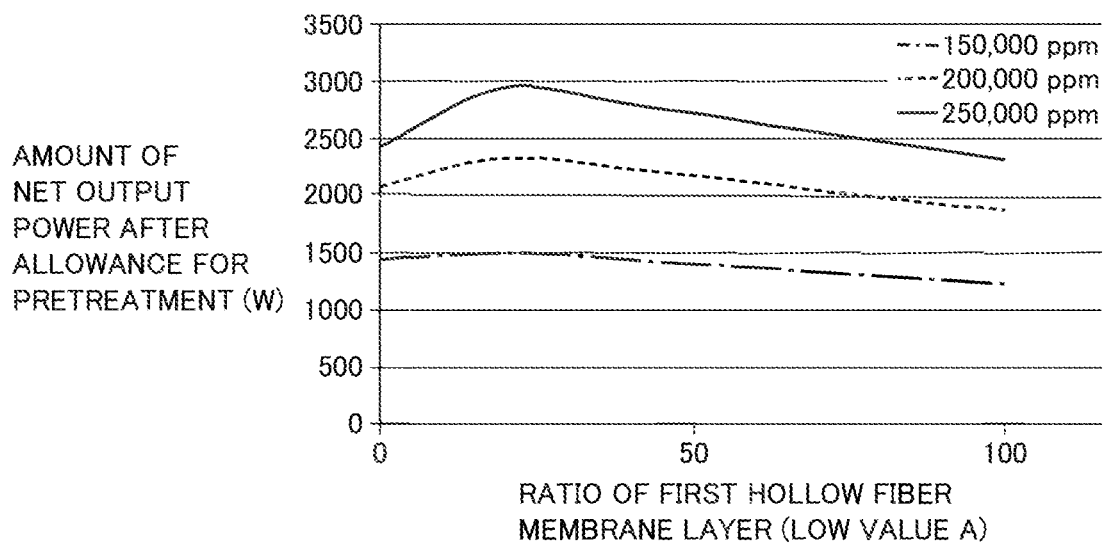
FIG. 14 is a graph showing a correlation between the ratio of a first hollow fiber membrane layer and the amount of net output power at the minimum FS flow rate in Example 3-2 (PRO) in which FS pretreatment with an NF membrane is performed.

The results shown in FIG. 14 indicate that using hollow fiber membranes having a low permeability coefficient in the first hollow fiber membrane layer (the inner layer) increased the amount of net output power when the ratio of the thickness of the first hollow fiber membrane layer was 30% or less. This increase is more remarkable than in Example 3-1 (FIG. 13), and considering the energy required for the FS pretreatment, it is proven that the effect according to the present invention to lower the minimum FS flow rate and thereby enhance the amount of net output power is more advantageous.

Moreover, the results shown in FIG. 12 to FIG. 14 indicate that in a case where the pressure applied to DS is 8 MPa, when the DS concentration is 200000 ppm (about 20 mass %) or more, effects of, among others, lowering the minimum FS flow rate and enhancing the amount of net output power according to the present invention are more remarkably exhibited. When the DS concentration is changed, the optimum pressure applied to DS changes.

It should be construed that all the embodiments and Examples disclosed herein are given by way of illustration in all respects, not by way of limitation. It should also be construed that the scope of the present invention is interpreted by the terms of the appended claims, not by the above description, and encompasses all modifications and variations equivalent in meaning and scope to the claims.

REFERENCE SIGNS LIST

1 vessel, 10, 11 feeding inlet, 12, 13 discharging outlet, 14, 15, 51, 52 wall member, 20 core tube, 21 hollow fiber membrane, 21a first hollow fiber membrane layer, 21b second hollow fiber membrane layer, 21c third hollow fiber membrane layer, 211 first hollow fiber membrane, 212 second hollow fiber membrane, 213 third hollow fiber membrane, 23 crossing, 3 outside of hollow fiber membrane, 41, 42 resin wall.

The invention claimed is:

1. A hollow fiber membrane element, comprising:
   a core tube comprising a side face having a plurality of pores;
   a hollow fiber membrane group consisting of a plurality of hollow fiber membranes disposed around the core tube; and
   resin walls securing the core tube and the hollow fiber membrane group at both ends,
   the hollow fiber membrane element being a both open-ended type hollow fiber membrane element in which both ends of the core tube and the plurality of hollow fiber membranes are open,
   the hollow fiber membrane group including a first hollow fiber membrane layer composed of a plurality of first hollow fiber membranes disposed so as to surround the core tube and a second hollow fiber membrane layer composed of a plurality of second hollow fiber membranes disposed so as to surround the first hollow fiber membrane layer,
   a permeability coefficient of the plurality of first hollow fiber membranes being smaller than a permeability coefficient of the plurality of second hollow fiber membranes.

2. The hollow fiber membrane element according to claim 1, wherein a rate of decrease of the permeability coefficient of the plurality of first hollow fiber membranes from the permeability coefficient of the plurality of second hollow fiber membranes is more than 0% and not more than 60%.

3. The hollow fiber membrane element according to claim 1, wherein the hollow fiber membrane element has a shape of cylinder, and the ratio of a thickness of the first hollow fiber membrane layer to a total thickness of the first hollow fiber membrane layer and the second hollow fiber membrane layer is more than 0% and not more than 30%.

4. The hollow fiber membrane element according to claim 1, wherein the plurality of hollow fiber membranes are spirally wound around the core tube in a crisscross fashion.

5. A hollow fiber membrane module comprising:
   the hollow fiber membrane element according to claim 1; and
   a vessel accommodating at least one hollow fiber membrane element according to claim 1.

6. A method of forward osmosis water treatment using the hollow fiber membrane module according to claim 5, the method comprising:
   a forward osmosis step involving flowing a treatment-target water containing water and a component other than water inside the plurality of hollow fiber membranes and flowing a draw solution containing a draw solute through the core tube to outside of the plurality of hollow fiber membranes, so as to allow water contained in the treatment-target water to move across the plurality of hollow fiber membranes toward the draw solution.

7. The method of forward osmosis water treatment according to claim 6, wherein a concentration of the draw solution is 7 mass % or more.

* * * * *